Aug. 13, 1968  S. S. BAITS  3,396,670
HYDRAULIC PUMP OR MOTOR
Filed Oct. 10, 1966  2 Sheets-Sheet 1
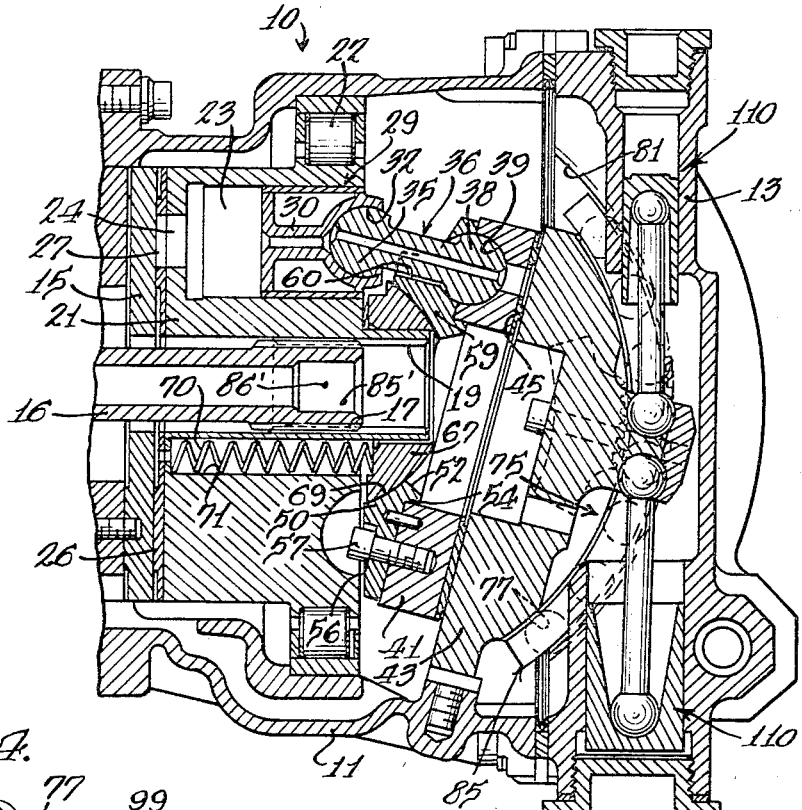
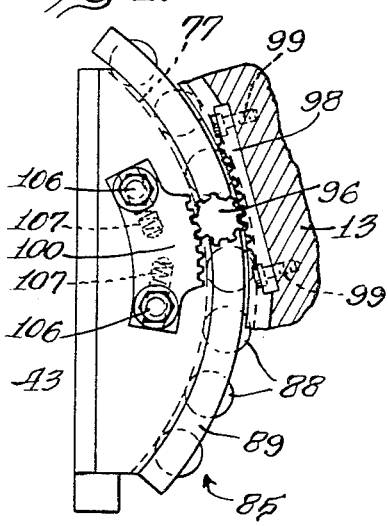
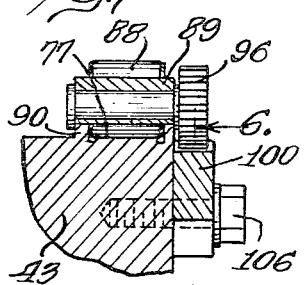
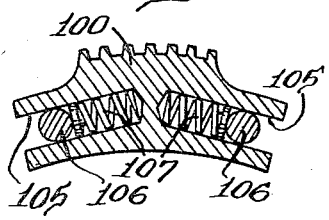
Inventor:
Stephen S. Baits
By Hofgren, Wegner,
Allen, Stellman & McCord
Attys United States Patent Office 3,396,670
Patented Aug. 13, 1968

3,396,670
HYDRAULIC PUMP OR MOTOR
Stephen S. Baits, Rockford, Ill., assignor to Sundstrand
Corporation, a corporation of Delaware
Filed Oct. 10, 1966, Ser. No. 585,673
10 Claims. (Cl. 103—162)

ABSTRACT OF THE DISCLOSURE

A variable displacement hydraulic unit having a pivotal cam for reciprocating pistons in the unit with the cam being mounted in the unit's housing by roller bearings which are assured of rolling motion by a bearing cage driven by the cam.

This invention relates to hydraulic fluid energy translating devices, and more particularly to axial piston pumps and motors wherein valving is accomplished by rotation of a cylinder block against a stationary valve member.

In axial piston devices of the type described above, a cam member reciprocates the piston in a rotating cylinder block and the pistons receive and discharge fluid through arcuate ports in a stationary valve member engaging one end of the cylinder block. In devices of this type means are usually provided for pivotally mounting the cam member in a housing surrounding the unit for varying the displacement of the device. One such means includes trunnions fixed to and extending from the cam member and mounted in bearings seated in opposite sides of the housing. If the diameter of the housing adjacent the cam is relatively large, the long span required between the trunnion bearings makes the pump quite bulky and increases the weight of the cam. One reason for a relatively large diameter housing at this point is that such is required in units which employ a bearing for mounting the cylinder block surrounding the periphery of the block.

For the above reason and certain others it has been found desirable to mount the cam member in one or more arcuate tracks within the housing. Prior mountings of this type have been unduly complicated, have not been suitable for high pressure operation and have required extremely large bearings.

It is therefore a primary object of the present invention to provide a new and improved mounting arrangement for a cam member in a multiple piston hydraulic unit.

Another object of the present invention is to provide a new and improved hydraulic unit with novel means for pivotally mounting the cam member capable of withstanding high loads including complementary arcuate tracks on the back of the cam member and in an associated housing member with a plurality of roller bearings in the tracks capable of transmitting the load on the cam member to the housing with means for constraining the roller bearings to arcuate rolling motion in the arcuate path defined by the tracks. Bearings in this location would normally have a tendency to creep as the displacement of the device is varied by pivoting the cam member. In the present device this problem is overcome by the provision of a cage which spaces and retains the bearings and a pinion gear carried by the cage which engages arcuate gear segments on both the cam member and the stationary housing thereby serving to drive the cage in its arcuate path and assure rolling contact between the bearings and the tracks in which they are seated.

A further object of the present invention is to provide a new and improved axial piston hydraulic unit of the type described immediately above in which one of the gear segments is resiliently mounted to permit limited creep of the bearings without damaging the driving pinion gear.

A still further object of the present invention is to provide a new and improved hydraulic unit of the type described above in which the axis of the pinion gear is offset slightly from the arcuate path of movement of the axes of the roller bearings so that the pinion gear may have a somewhat different pitch circle diameter than the diameter of the bearing elements and still drive the cage so that the bearings have pure rolling motion in the tracks.

Other objects and advantages will be apparent from the following detailed description taken in connection with the accompanying drawings in which:

FIG. 1 is a longitudinal section of a hydraulic unit according to the present invention;

FIG. 4 is a fragmentary view of the bearing driving assembly taken generally along line 4—4 of FIG. 3 but with the addition of a portion of the housing not shown in FIG. 3;

FIG. 5 is a fragmentary cross section taken generally along line 5—5 of FIG. 3 showing the pinion mounting; and FIG. 6 is a cross section taken generally along line 6—6 of FIG. 5 showing the resilient mounting for the cam connected gear segment.

Figure 2:
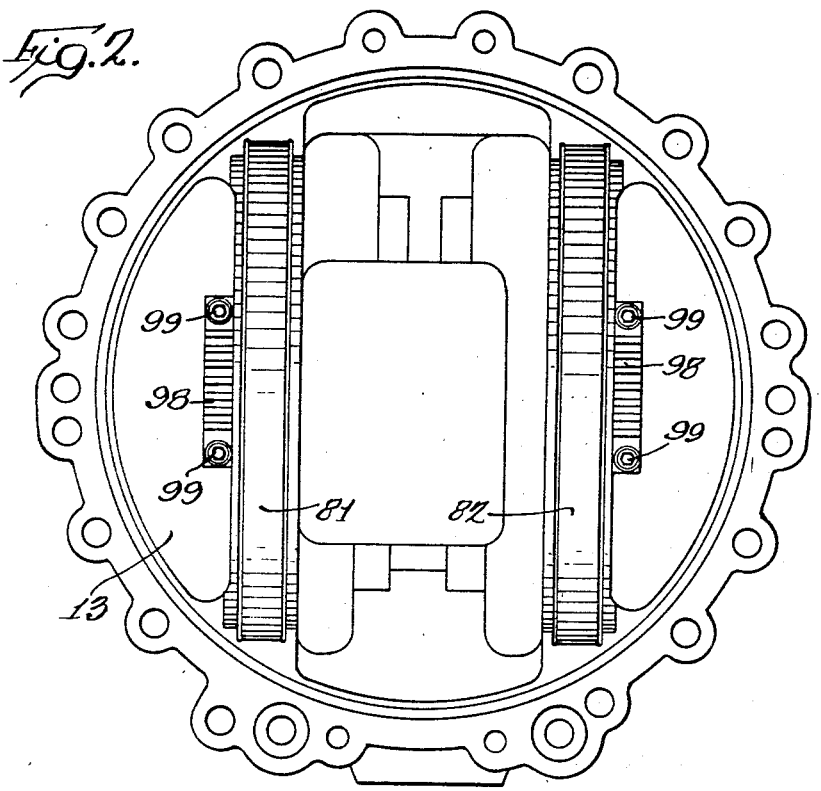
FIG. 2 is a sub-assembly of the housing cover shown in FIG. 1 with the cam member removed illustrating the housing cam tracks.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring to the drawings and particularly FIG. 1, a hydraulic unit 10 according to the present invention is seen to consist of a cast generally cylindrical housing 11 with a cover housing member 13 fixed thereto by suitable fasteners (not shown). It should be understood that the hydraulic unit 10 may operate either as a pump or a motor depending upon whether it is driven by a suitable prime mover or delivered hydraulic fluid under pressure from a suitable source. For simplicity of description, the hydraulic unit 10 will henceforth be described as a pump.

Mounted within the housing 11 is a port plate 15 having conventionally arranged arcuate inlet and outlet ports therein (not shown). When the device operates as a pump, fluid is delivered to one of these ports through conduits (not shown) and delivered from the device under pressure through the other port. An input shaft 16 is adapted to be driven in rotation by a suitable prime mover and has splines 17 on one end thereof interengaging splines 19 formed internally on a rotatable cylinder block 21. Cylinder block 21 is generally angular in configuration and is mounted for rotation in the housing member 11 by peripheral bearing 22.

The cylinder block 21 has a plurality of axially disposed cylinders 23 therein formed in annular array about the axis of rotation of the block. Port passages 24 communicate each of the cylinders 23 serially with the inlet and outlets ports in the valve plate 15 as the cylinder block rotates. The cylinder block 21 has a bearing plate 26 bonded to one end thereof and slidably engaging the port plate 15. Bearing plate 26 has ports 27 therein corresponding and complementary with the ports 24 in the cylinder block.

Slidably mounted in each of the cylinders 23 is a piston 29 including an integral central stem portion 30 having a spherical seat 32 for receiving a spherical portion 35 of one of a plurality of connecting rods 36.

Each of the connecting rods 36 has a spherical portion 38 at the other end thereof seated in a spherical socket 39 in a unitary annular ring 41.

A cam member 43 pivotally mounted in housing 11, serves to reciprocate the pistons 29 through the annular ring 41 and connecting rods 36.

The point where the axis of input shaft 16 pierces the plane containing the spherical rod portions 35 preferably bisects the axial length of the bearing 22.

In order to cause rotation of the annular ring 41 with the cylinder block 21 and to maintain the proper timing between the ring and the cylinder block so that the rods 36 remain substantially perpendicular to camming surface 45 in planes taken through the rods 36 tangent the path of travel of the rod portions 38, a retaining ring or timing member 50 is provided fixed to the annular ring 41. As will appear hereinbelow the ring 50 is suitably supported radially to maintain the rotational center of ring 41 fixed with respect to the cam 43.

The timing member 50 is seen to include a one piece member of generally annular configuration with an axial bore 52 therethrough. Member 50 has a reduced annular portion 54 which fixedly receives the annular ring 41. A flat radial surface 56 substantially parallel to the ring 41 receives suitable fastening means such as Allenhead screws 57 which extend into the ring 41 thereby fixing member 50 securely thereto.

Extending axially from the surface 56 are a plurality of projecting lands 59 each having a radial slot 60 for receiving one of the rods 36. Slots 60 extend axially completely through the member 50.

The slots 60 provide a sufficient radial clearance for the rods 36 to provide unrestricted radial pivoting of the rods as shown. This radial pivoting, i.e., pivotal movement in a plane extending through the rods 36 and the axis of the ring is inherent in the present device due to the fact that the ring-connected ends of the rods, i.e., spherical portions 38 scribe a circular path while the piston-connected ends of the rods, i.e. spherical portions 35, appear from the ring 33 to scribe an elliptical path. As the cylinder block 21 rotates, the rods will intermittently engage the sides of the slots 60 to drive the timing ring 50 and the annular ring 41 in rotation. While the slots permit some limited tangential pivoting of the rods 36, they fit closely enough to maintain the rods substantially perpendicular to the camming face 45 in any tangential plane, that is, a plane tangent to a circle through the rod ends 38.

A spherical retainer member 67 is provided for supporting the timing member 50 and constraining the annular ring 41 so that it rotates about a stationary axis with respect to the cam 43. The spherical retainer 67 is closely fitted on a rearwardly extending axial projection 68 on the cylinder block. Some limited axial sliding movement is permitted, however, between the spherical member 67 and the projection 68 for purposes described below. Formed within the timing member 50 is a spherical surface 69 which is mounted on the spherical outer surface of the retainer 67. This permits pivotal adjustment of the cam 43 and the retainer ring 41 with respect to the retainer ball 67, but the ball 67 radially supports the ring 41 and absorbs radial loads therefrom.

It should be noted that it is the spherical retainer 67 which radially locates the rods 36, and that the slots 60 have sufficient radial clearance with respect to the rods so that they do not restrain the rods in a radial direction. Thus, the slots 60 and member 50 serve to transmit only timing torque from the pistons 29 to the unitary ring 41, while the rods 36 are radially or laterally located by the spherical retainer 67 which is immovable radially.

In addition to the locating and restraining function of the retainer 67, it also provides a piston return function by maintaining sliding engagement between the unitary ring 41 and the camming surface 45. Toward this end, springs 70 seated within bores 71 in the cylinder block 21 bear against the spherical member 67 urging it axially away from the cylinder block toward the camming member so that ring 41 is urged against the camming surface 45. This biasing of the spherical ball 67 furthermore gives it the ability to resist the side thrust generated by the rotating unitary ring 41 and the elements associated therewith.

At the full displacement position of the swashplate member 43 the connecting rods 36 have substantial angular relationship with the pistons 29 and therefore exert side loads on the pistons through the spherical balls 35, but the connecting rods 36 remain substantially perpendicular to the camming surface 45 in all adjusted positions of the swashplate 43 and therefore exert no side loads, or loads parallel to the surface 45 on the cam member swashplate 43. In this manner the side forces on the block are located close to the port plate 15 and are effectively opposed by bearing 22, the proper location of which is facilitated by the described construction.

A new and improved mounting assembly 75 is provided for pivotally mounting the cam member 43 within the housing member 13, thereby permitting the displacement of the hydraulic unit 10 to be varied as desired.

Toward this end, the rear surface of the cam member 43 is generally cylindrical with spaced arcuate bearing tracks 77 and 78 defined by ribs 90 projecting rearwardly from the cam member. Adjacent the tracks 77 and 78 are arcuate tracks 81 and 82 in the housing member 13. Tracks 77, 78, 81, and 82 are defined about circles having a center axis at point 85' so that the cam member 43 pivots thereabout. It should be noted that point 85' is somewhat displaced from point 86' which is the point defined by the intersection of the axis of shaft 16 and the centroid of a plane defined by the pivotal interconnections between the rods 36 and the pistons 29 for the purpose of modifying the nature of the forces on the cam member 43.

Seated in both the tracks in the cam member 43 and in the housing 13 are two bearing assemblies 85 and 86. The bearing assemblies each include a plurality of roller bearings 88 spaced from each other by a suitable arcuate cage member 89 having generally rectangular openings 92 therein for receiving the bearings.

Figure 3:
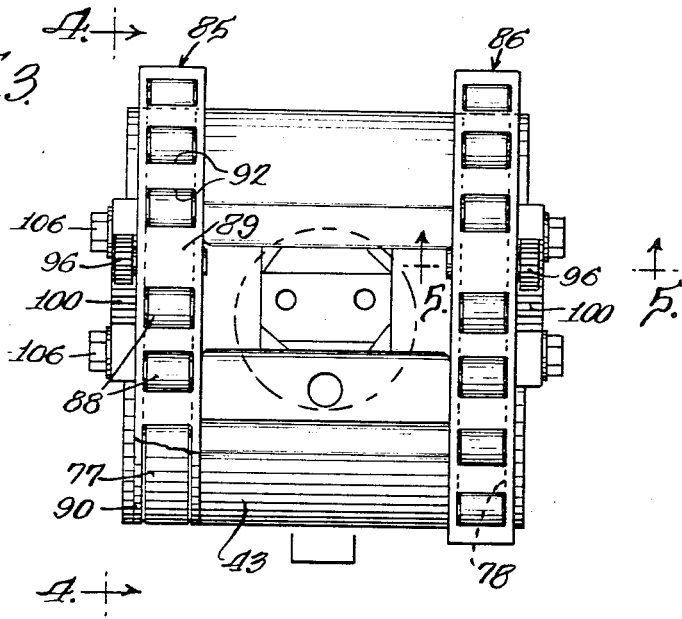
FIG. 3 is a sub-assembly view of the rear of the cam plate shown in FIG. 1 with the bearing assemblies in place.

As the cam member 43 is pivoted in housing 13 the roller bearings 88 roll in both the tracks 81 and 82 in the housing 13 and in the corresponding tracks 77 and 78 on the back of the cam member 43. (Note that the cam as shown in FIG. 3 must be rotated 180 degrees about a vertical axis to be positioned in the housing as shown in FIG. 2.) However, some means must be provided for preventing the bearings 88 from creeping and moving out the ends of the tracks and for assuring proper rolling contact with the tracks.

The present device includes means for driving each of the bearing assemblies 85, 86 in response to movement of the cam member 43 to assure the proper rolling movement of the roller bearings 88. Toward this end, each of the bearing assemblies 85, 86 has a pinion 96 mounted for rotation centrally in the cage 89 and extending outwardly therefrom beyond the sides of the cam 43.

The pinions 96 engage arcuate gear segments mounted in the housing 13 by suitable fasteners 99, (see FIGS. 2 and 4). The gear segments 98 are positioned adjacent the tracks 81 and 82 approximately centrally thereof. Also interengaging the pinions 96 are arcuate external gear segments 100 mounted on the sides of the cam member 43.

As the cam member 43 is pivoted within the housing 13 gear segments 100 drive the pinions 96 in rotation against the stationary gear segments 98 causing planetary motion of the pinions 96 and thereby driving the bearing cages 89. Note that for pure rolling contact between the bearings 88 and the tracks in both the cam member 43 and the housing 13, that the cam member 43 should move during pivotal adjustment an arcuate length substantially twice the arcuate movement of the axes of the bearings 88.

The pinions 96 and the gear segments 98 and 100 interengaging therewith are sized and positioned so that the axes of the pinions travel at a rate so that the cages 89 travel at the same rate as the axes of the bearing elements 88 under pure rolling movement. Ideally, this could be effected by selecting the pitch diameter of the pinions 96 equal to the diameter of the roller bearings 88. As a practical matter however, in order to select an integral number of ordinary sized teeth for the pinions 96 the pitch circle of the pinions may be different, in this case smaller, than the diameter of the roller bearings 88.

To compensate for this difference, the axes of the pinions 96 are offset radially inwardly from the arcuate path of the rollers 88 in the cages 89 so that the pinions 96 are somewhat closer to the pivotal axis 85' and thus scribe an arc of shorter radius. This radial offset of the pinions 96 causes them to rotate about their own axes more slowly than they would if they were positioned in the path of the axes of rollers 88 thus compensating for their smaller pitch circle diameter. It will be apparent that the offset of the pinions 96 depends upon the diameter of the pitch circle selected with respect to the diameter of the rollers 88 and is such that the pinions 96 drive the cages 89 at the same speed as the axes of the roller bearings 88.

Notwithstanding the pinion and gear arrangement, some creepage of the roller bearings 88 as the cam member is pivoted may not practically be prevented. To compensate for this and to prevent damage to the pinions and gear segments, the gear segments 100 are resiliently mounted on the sides of the cam member 43. As shown clearly in FIG. 6 each of the gear segments 100 has two opposed generally tangential slots 105 extending inwardly from each end thereof. Suitable fasteners 106 extend through the slots and are threadedly received in the cam member 43. Coil compression spring assemblies 107 are seated within each of the slots 105 against the fasteners 106 urging the gear segment 100 to a central position, but permitting some lateral movement of the gear segment. Thus, if bearings 88 creep under high load during adjustment of the cam member 43, the gear segments 100 may shift somewhat from the position shown in FIG. 6 (in either direction) relieving a major portion of the load that would otherwise be imposed on the gear teeth. After the creepage force is relieved by further movement of the cam member 43 the spring assemblies 107 will center the gear segments 100 and the cages 89.

A suitable hydraulic cylinder arrangement 110 is provided in the housing member 13 for positioning the cam member 43 to any desired displacement position on either side of neutral. The specific arrangement for positioning cam 43 forms no part of the present invention and as will be apparent to those skilled in the art other suitable means may be provided for this purpose.

I claim:
1. A hydraulic energy translating device, comprising: housing means, valve means having inlet and outlet ports therein, a cylinder block mounted in said housing means for rotation relative to said valve means and having a plurality of cylinders therein, pistons slidable in said cylinders, a cam member for reciprocating said pistons in the cylinders, means for supporting said cam member in said housing means for pivotal movement, means for pivoting said cam member relative to said support means, a plurality of rollable bearing elements between said cam member and said support means, means normally constraining said bearing elements to rolling motion in a generally arcuate path, said constraining means including a unitary cage for retaining said bearing elements, and means for driving said cage in said generally arcuate path in response to movement of said cam member.

2. The combination as defined in claim 1, wherein said driving means drives said cage substantially one half the distance of movement of said cam member.

3. The combination as defined in claim 1, wherein said driving means includes a pinion gear journalled in said cage, first gear means fixed with respect to said support means and engaging said pinion gear, second gear means fixed with respect to said cam member and engaging said pinion gear so that movement of the cam member drives the pinion in planetary motion.

4. The combination as defined in claim 4, wherein said second gear means is resiliently mounted on said cam member to compensate for any creep of the bearing elements.

5. The combination as defined in claim 4, wherein the axes of said bearing elements move in an arcuate path, the pitch circle diameter of said pinion gear being slightly different than the diameter of said bearing elements, said pinion gear being mounted in said cage so that the axis of said gear is slightly offset with respect to said bearing axes arcuate path to compensate for the difference in said diameter and to assure rolling motion of said bearing elements.

6. The combination as defined in claim 5, wherein said second gear means includes an arcuate gear segment, said segment having two generally tangentially extending slots therein, projections fixed to said cam member and extending through each of said slots, spring means in each of said slots seated against the respective projections and urging said second gear segment toward a center position.

7. A hydraulic energy translating device, comprising: housing means, valve means having inlet and outlet ports therein, a cylinder block mounted in said housing means for rotation relative to said valve means and having a plurality of cylinders therein, pistons slidable in said cylinders, a cam member for reciprocating said pistons in the cylinders, means for supporting said cam member in said housing means for pivotal movement, means for pivoting said cam member relative to said support means, a plurality of rollable bearing elements between said cam member and said support means, means normally constraining said bearing elements to rolling motion in a generally arcuate path, said support means including two spaced arcuate tracks, said cam member having two complementary spaced arcuate tracks adjacent thereto, said bearing elements including two sets of roller bearings mounted for rolling movement in said tracks, said means for constraining movement of said bearing elements including an arcuate unitary cage for each set of roller bearings, means for driving said cages including a pinion mounted in each of said cages about an axis parallel to the axes of roller bearings and extending outwardly from said cam member, spaced arcuate internal gear segments in said housing each engaging one of said pinion gears, and spaced arcuate external gear segments mounted on the sides of said cam member and each engaging one of said pinion gears.

8. The combination as defined in claim 1 wherein said drive means includes a resilient connection to permit limited creep of said bearing elements.

9. The combination as defined in claim 2 wherein said driving means includes means permitting the movement of said cage to deviate from said one-half the distance of movement of said cam member.

10. A hydraulic energy translating device comprising: housing means, a valve plate in said housing means having arcuate inlet and outlet ports therein, a cylinder block rotatably mounted in said housing means having a plurality of axial cylinders therein, pistons slidably mounted in said cylinders, a cam member for reciprocating said pistons in said cylinders, said cam member having two complementary spaced arcuate tracks on the side thereof opposite said pistons, means for supporting said cam member in said housing means for pivotal movement including two spaced arcuate tracks in the housing means being complementary with the tracks on said cam member and defining therewith two sets of tracks, a plurality of rollable bearing elements in each of said track sets between said cam member and said housing means each engaging one track on the cam member and one track in said housing means, an arcuate unitary cage for each set of roller bearings normally constraining movement of said bearing elements to rolling motion in an arcuate path, means for driving said cages including a pinion mounted in each of said cages around an axis parallel to the axis of said roller bearings and extending outwardly from said cam member, spaced arcuate internal gear segments in said housing each engaging one of said pinion gears, and spaced arcuate external gear segments mounted on the sides of said cam member and each engaging one of said pinion gears.

References Cited

UNITED STATES PATENTS

| | | | |
|---|---|---|---|
| 1,908,612 | 5/1933 | Johnson | 103—162 |
| 2,860,581 | 11/1958 | Buckner | 103—162 |

FOREIGN PATENTS

| | | |
|---|---|---|
| 833,347 | 3/1943 | France. |
| 539,637 | 9/1941 | Great Britain. |

WILLIAM L. FREEH, *Primary Examiner.*